US008985266B2

(12) United States Patent
Sato et al.

(10) Patent No.: US 8,985,266 B2
(45) Date of Patent: Mar. 24, 2015

(54) REAR WHEEL STEERING APPARATUS FOR VEHICLE

(71) Applicant: Aisin Seiki Kabushiki Kaisha, Kariya-shi (JP)

(72) Inventors: Teruhide Sato, Toyota (JP); Takashi Hirai, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/289,855

(22) Filed: May 29, 2014

(65) Prior Publication Data

US 2014/0353072 A1      Dec. 4, 2014

(30) Foreign Application Priority Data

May 29, 2013    (JP) .................................. 2013-112502

(51) Int. Cl.
*B62D 5/04* (2006.01)
(52) U.S. Cl.
CPC .................................... *B62D 5/0406* (2013.01)
USPC .......................................... 180/444; 180/445
(58) Field of Classification Search
CPC .. B62D 5/0404; B62D 5/0406; B62D 5/0424; B62D 5/0421
USPC .................. 180/443, 444, 445, 446
See application file for complete search history.

(56) References Cited

U.S. PATENT DOCUMENTS

| | | | |
|---|---|---|---|
| 5,595,089 A | 1/1997 | Watanabe et al. | |
| 6,750,574 B2* | 6/2004 | Okazaki et al. | 310/68 B |
| 7,448,285 B2* | 11/2008 | Nakatani | 73/862.321 |
| 7,950,301 B2* | 5/2011 | Yamaguchi | 74/89.23 |
| 8,607,920 B2 | 12/2013 | Jungbecker et al. | |
| 2002/0175574 A1 | 11/2002 | Okazaki et al. | |
| 2007/0205038 A1 | 9/2007 | Tominaga et al. | |
| 2008/0223160 A1 | 9/2008 | Yamaguchi | |

FOREIGN PATENT DOCUMENTS

| | | |
|---|---|---|
| EP | 1 970 598 A1 | 9/2008 |
| FR | 2 825 200 A1 | 11/2002 |

(Continued)

OTHER PUBLICATIONS

The Extended European Search Report issued on Oct. 6, 2014, by the European Patent Office in corresponding European Patent Application No. 14170104.5. (6 pages).

*Primary Examiner* — Kevin Hurley
(74) *Attorney, Agent, or Firm* — Buchanan Ingersoll & Rooney PC

(57) ABSTRACT

A rear wheel steering apparatus for a vehicle includes a housing including a cylinder portion and a casing, a linear motion mechanism including a nut member and a rod, the casing including at least one opening portion that opens in parallel to the rod and a communication hole provided separately from the opening portion, the casing positioned surrounding the rod extending from the cylinder portion and being fixed to the cylinder portion, a cover member joined to the casing to seal the opening portion of the casing, a controller housed in the casing, a power line and a signal line electrically connected to the controller in the casing, and a thermal shrinkage tube surrounding the power line and the signal line to retain thereof. The power line and the signal line are liquid-tightly supported in the communication hole of the casing via the thermal shrinkage tube.

8 Claims, 4 Drawing Sheets

(56) References Cited

FOREIGN PATENT DOCUMENTS

| JP | 3068779 B2 | 7/2000 |
| JP | 3206783 B2 | 9/2001 |
| JP | 2012-511465 A | 5/2012 |
| JP | 5098242 B2 | 12/2012 |
| WO | WO 2010/066732 A1 | 6/2010 |

* cited by examiner

REAR WHEEL STEERING APPARATUS FOR VEHICLE

CROSS REFERENCE TO RELATED APPLICATIONS

This application is based on and claims priority under 35 U.S.C. §119 to Japanese Patent Application 2013-112502, filed on May 29, 2013, the entire content of which is incorporated herein by reference.

TECHNICAL FIELD

This disclosure generally relates to a rear wheel steering apparatus for a vehicle.

BACKGROUND DISCUSSION

Various known rear steering apparatuses each serving as a part of a four-wheel steering system of a vehicle are disclosed. For example, JP5098242B (i.e., hereinafter referred to as Patent reference 1) discloses a basic structure that includes a rod connected to rear wheels of a vehicle, a housing supporting the rod and fixed to a chassis of the vehicle, and a motor housed in the housing and actuating the rod for steering the rear wheels. There are various types of suspension mechanisms for supporting rear wheels of a vehicle and thus types of the rear wheel steering apparatus mounted to the suspension mechanism are varied. For example, JP2012-511465A (i.e., hereinafter referred to as Patent reference 2) discloses an apparatus that includes a blocking device for selectively transmitting a drive force from an electric motor to a push rod and the blocking device is supported by a module housing together with the electric motor and a transmission that is for converting a rotation of the electric motor to a translation of the push rod. Patent reference 2 further discloses a control unit for controlling the electric motor, the blocking device, and the transmission.

According to the apparatus disclosed in Patent reference 2, because the electric motor, the transmission and the blocking device are supported by the module housing, assembling is difficult. Further, according to the apparatus disclosed in Patent reference 2, because the housing is required to have high mechanical strength, it is difficult to downsize the housing. Patent reference 2 discloses an electric interface that forms a portion of a circuit board of the control unit. Patent reference 2 further discloses an external electric interface for an outgoing cable extending to a bus line of a CAN of the vehicle or a brake control unit. The external electric interface is connected to the control unit while being joined to a cover. Thus, according to the construction disclosed in Patent reference 2, the module housing and the cover are needed to be joined with water-proof joining structure and further, the cover and the external electric interface are needed to be joined with water-proof joining structure. Further, according to the construction disclosed in Patent reference 2, a water-proof connecter is required for connecting the control unit to the cable. On the other hand, regarding the construction of Patent reference 1, because a controller (control unit) for controlling the actuation of the motor, for example, is generally disposed within a case and mounted to the housing, a water-proof joining structure is provided between the case and the housing and a water-proof connecter is applied for joining the controller to a cable including a power line and a signal line. Because large-sized and high-priced water-proof connecter is required for the apparatuses disclosed in Patent reference 1 and Patent reference 2 in addition to providing the water-proof joining structure of the housing, for example, a manufacturing cost increases.

A need thus exists for a rear wheel steering apparatus for a vehicle which is not susceptible to the drawback mentioned above.

SUMMARY

In light of the foregoing, the disclosure provides a rear wheel steering apparatus for a vehicle configured to be provided at a suspension mechanism supporting a rear wheel of the vehicle and for steering the rear wheel. The rear wheel steering apparatus includes a housing configured to be connected to the suspension mechanism via a first connection member and a second connection member, the housing including a cylinder portion and a casing, an electric motor housed in the cylinder portion, a speed reduction mechanism housed in the cylinder portion and reducing speed of an output of the electric motor, a linear motion mechanism including a nut member rotatably connecting to the speed reduction mechanism and a rod threadingly engaged with the nut member and connecting to the second connection member, the linear motion mechanism converting a rotation of the nut member to a linear motion of the rod, the casing including at least one opening portion that opens in parallel to the rod and a communication hole provided separately from the opening portion, the casing positioned surrounding the rod extending from the cylinder portion and being fixed to the cylinder portion, a cover member joined to the casing to seal an opening portion of the casing, a controller housed in the casing and controlling an actuation of the electric motor, a power line and a signal line electrically connected to the controller in the casing, and a thermal shrinkage tube surrounding the power line and the signal line to retain thereof. The power line and the signal line are liquid-tightly supported in the communication hole of the casing via the thermal shrinkage tube.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
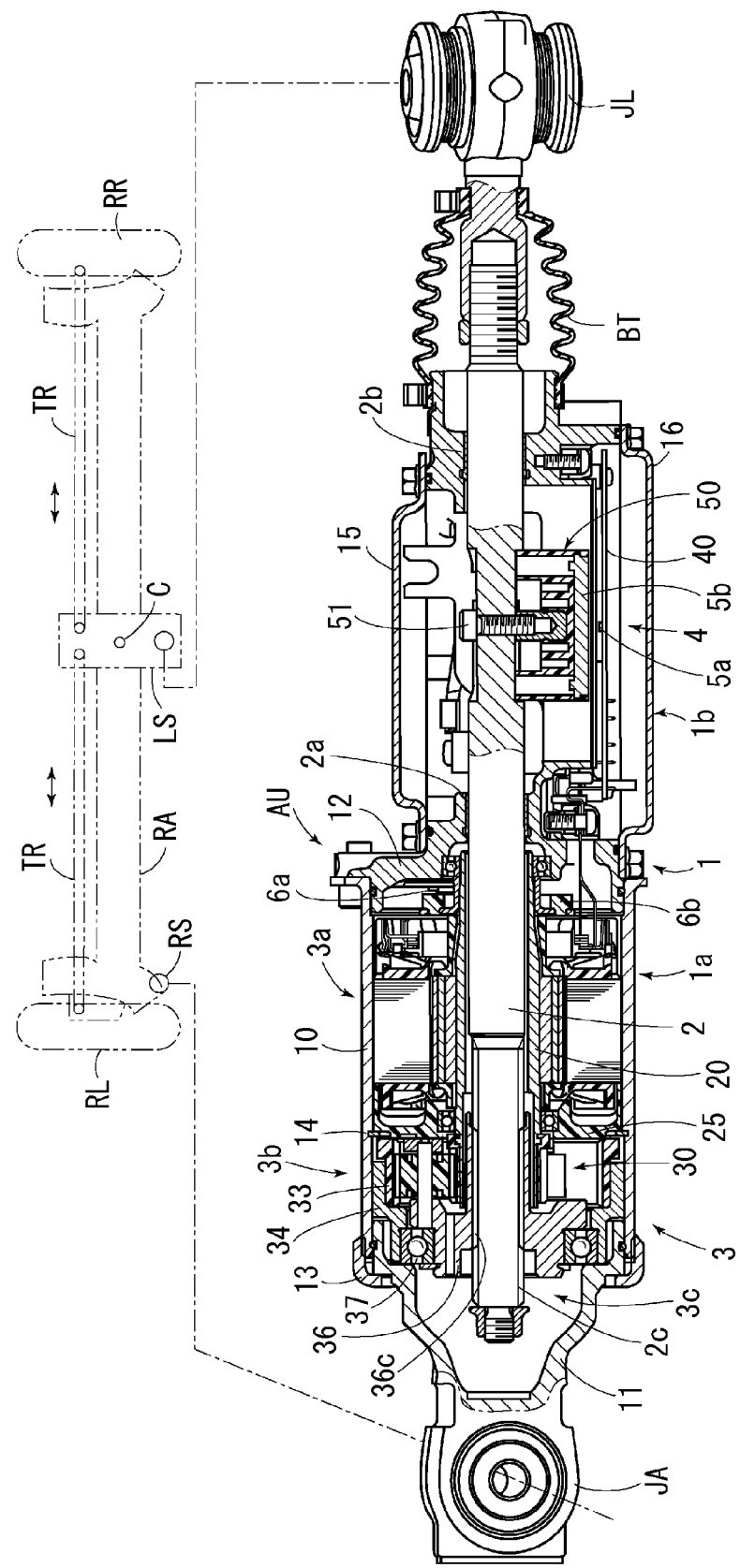
FIG. 1 is a lateral cross-sectional view illustrating an overall construction of a rear wheel steering apparatus according to an embodiment disclosed here.

One embodiment will be explained with reference to illustrations of drawing figures as follows. A rear wheel steering apparatus of the embodiment serves as a portion of a four-wheel steering system (4WS). The construction of a front wheel steering apparatus is the same to known constructions, thus the construction of the front wheel steering apparatus will not be explained. There are various suspension mechanisms for supporting vehicle rear wheels. According to the embodiment, as illustrated in FIG. 1, a suspension mechanism is structured as indicated with two-dotted chain line, where an actuator unit AU constructing a rear wheel steering apparatus of the embodiment is provided between a support portion RS and a link LS. The support portion RS supports a rear axle RA that supports vehicle rear wheels RL, RR. The link LS is pivotally supported by the rear axle RA and rotates about a center C. According to the suspension mechanism of the embodiment, a relative position between the support portion RS and the link LS is changed by the actuation of the actuator unit AU so that a distance between the support portion RS and the link LS is expanded and contracted, and thus the rear wheels RL, RR are steered via tie rods TR, TR, respectively in response to the rotation of the link LS.

The actuator unit AU is supported by a housing 1 in a manner that a rod 2 is axially movable (linear motion), an end of the actuator unit AU is connected to the link LS via a ball joint JL (serving as a second connection member), and the housing 1 is connected to the support portion RS via a ball joint JA (serving as a first connection member). Upon the actuation of the rod 2 by an actuator 3, the relative position between the support portion RS of the rear axle RA and the link LS is changed so that the distance between the support portion RS and the link LS is expanded and contracted. More particularly, an electric motor 3a constructing the actuator 3 is controlled by a controller 4, and a rotational output of the electric motor 3a is converted into the linear motion of the rod 2 via a linear motion mechanism 3c after the speed of the rotational output of the electric motor 3a is reduced by a speed reduction mechanism 3b. According to the embodiment, a brushless motor is applied as the electric motor 3a.

According to the embodiment, the housing 1 includes a first housing 1a that accommodates components (e.g., the electric motor 3a) of the actuator 3 and a second housing 1b that accommodates components (e.g., electronic circuit board 40) of the controller 4. A connection cover 11 is joined to a cylinder portion 10 that structures the first housing 1a. A casing 12 that structures the second housing 1b and includes opening portions in an axial direction and in an upward-downward direction is joined to the cylinder portion 10. Cover members 15, 16 are joined to the casing 12 at opening portions 12x, 12y, respectively, that open in parallel with the rod 2. The cover members 15, 16 are joined to the casing 12 via O-rings OR serving as seal members, respectively. The opening portion 12x is provided at an upper portion of the casing 12 and the opening portion 12y is provided at a lower portion of the casing 12. The housing 1 of the embodiment is made of metal. The connection cover 11 and the casing 12 are made of aluminum. The cylinder portion 10 and the cover members 15, 16 are made of iron.

Figure 2:
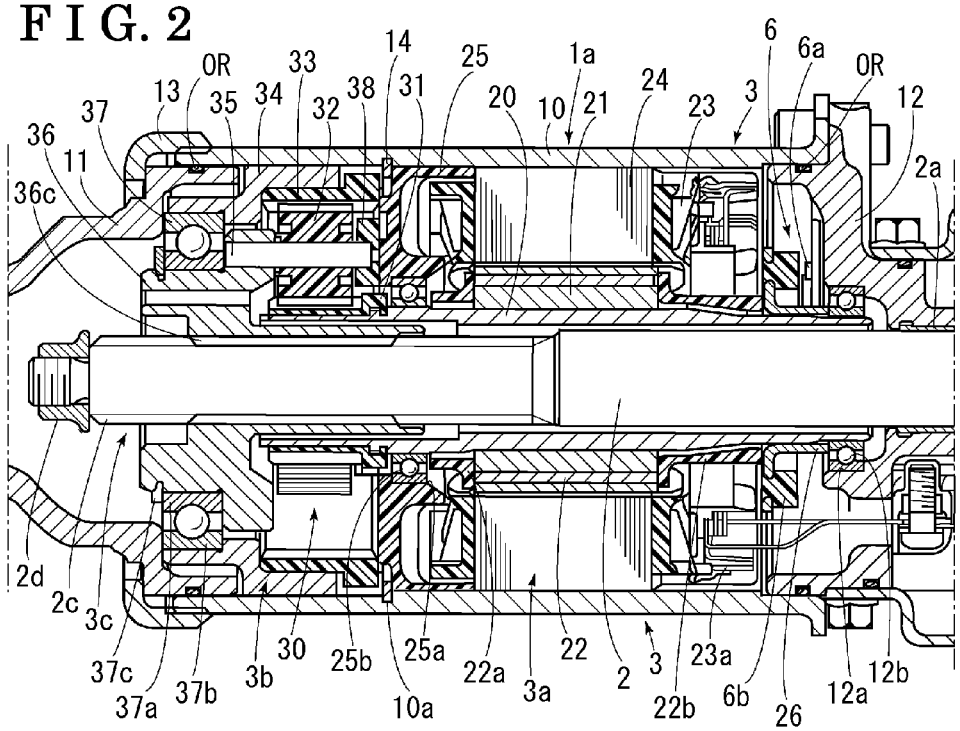
FIG. 2 is an enlarged lateral cross-sectional view showing an actuator unit of the rear wheel steering apparatus according to the embodiment disclosed here.

As illustrated in FIG. 2, the actuator 3 is press-fitted into and fixed to the cylinder portion 10 in a state where coils 23 are wound at a stator 24. A hollow rotation shaft 20 serves as an output shaft of the electric motor 3a. The hollow rotation shaft 20 is rotatably supported at a bore portion 25a of an annular motor cover 25 that is positioned within the cylinder portion 10 and at an annular groove 12a formed on the casing 12 via bearings 25b, 12b, respectively. A core 21 that structures a rotor of the electric motor 3a is press fitted and fixed to an axial intermediate portion of the hollow rotation shaft 20. Permanent magnets 22 are positioned so as to be equally spaced in a circumferential direction of the core 21.

The rod 2 is coaxially positioned within the hollow rotation shaft 20. The rod 2 is supported to be axially movable relative to the housing 1 (linear motion) and not to be rotatable relative to the housing 1. Bushes 2a, 2b are provided between the rod 2 and a support portion of the casing 12 to reduce a slide resistance for providing a smooth axial motion of the rod 2. That is, because an expansion and contracting mechanism with a cantilever structure is provided according to the embodiment, function, or capacity as bearings for an axial motion mechanism for supporting double ends is not required for the bushes 2a, 2b.

The speed reduction mechanism 3b of the embodiment is structured with a planetary gear mechanism 30. The planetary gear mechanism 30 includes a sun gear 31 with an external gear, planetary gears 32 with external gears, and a ring gear 33 with an internal gear. The sun gear 31 is integrally connected to the hollow rotation shaft 20 and is rotatably supported together with the hollow rotation shaft 20. The ring gear 33 is fixed to a holder 34 serving as a cylindrical holding member. The planetary gear 32 is meshed with the sun gear 31 and the ring gear 33 to revolve about the sun gear 31. A nut member 36, which serves as a carrier rotatably supporting the planetary gear 32 via a pin 35, is rotatably supported at the holder 34 via a bearing 37. A ball bearing is applied as the bearing 37. An inner race 37a of the bearing 37 is fitted together with the nut member 36 and an outer race 37b of the bearing 37 is fitted together with the holder 34 so that the bearing 37 is retained at the nut member 36 by means of a C-shaped spacer 37c.

According to the embodiment, the holder 34 and the pin 35 are made of metal (e.g., iron). The sun gear 31, the planetary gear 32, and the ring gear 33 are made of synthetic resin. The sun gear 31 is integrally formed with the hollow rotation shaft 20 made of metal. The ring gear 33 is supported not to be rotatable relative to the holder 34. The holder 34 is supported so as not to be rotatable relative to the cylinder portion 10. More specifically, as illustrated in FIG. 2, a snap ring 14 is retained in an annular groove 10a formed on an inner surface of the cylinder portion 10. An annular lock nut 13 threadingly engages with a screw portion formed at an opening end of the speed reduction mechanism 3b (i.e., left-hand side in FIG. 2) of the cylinder portion 10 in a state where the outer race 37b of the bearing 37 and the holder 34 are sandwiched between an annular side surface of the snap ring 14 and an annular opening end surface of the connection cover 11. The cylinder portion 10 and the connection cover 11 are fastened, accordingly. The outer race 37b of the bearing 37 and the holder 34 are firmly supported between the snap ring 14 and the connection cover 11 by an axial pressure force generated in response to threading engagement of the lock nut 13 to the screw portion, and in consequence, the holder 34 is retained so as not to rotate relative to the cylinder portion 10.

The rod 2 and the nut member 36 are positioned so that a male screw portion 2c formed at an outer peripheral surface at an end portion of the rod 2 and a female screw portion 36c formed on an inner peripheral surface of the nut member 36 are threadingly engaged with each other. A trapezoidal screw formed on the outer peripheral surface at an end portion of the rod 2 over a predetermined axial length serves as the male screw portion 2c. The nut member 36 and the rod 2 structure the linear motion mechanism 3c. A nut 2d is threadingly engaged with an end of the male screw portion 2c to prevent the rod 2 from falling out, or disengaging. Because the rod 2 is supported in the above-explained manner, the load applied to the rod 2 in an axial direction is absorbed by the cylinder portion 10 and the connection cover 11 via the nut member 36, the bearing 37, the holder 34, and the snap ring 14.

Figure 3:
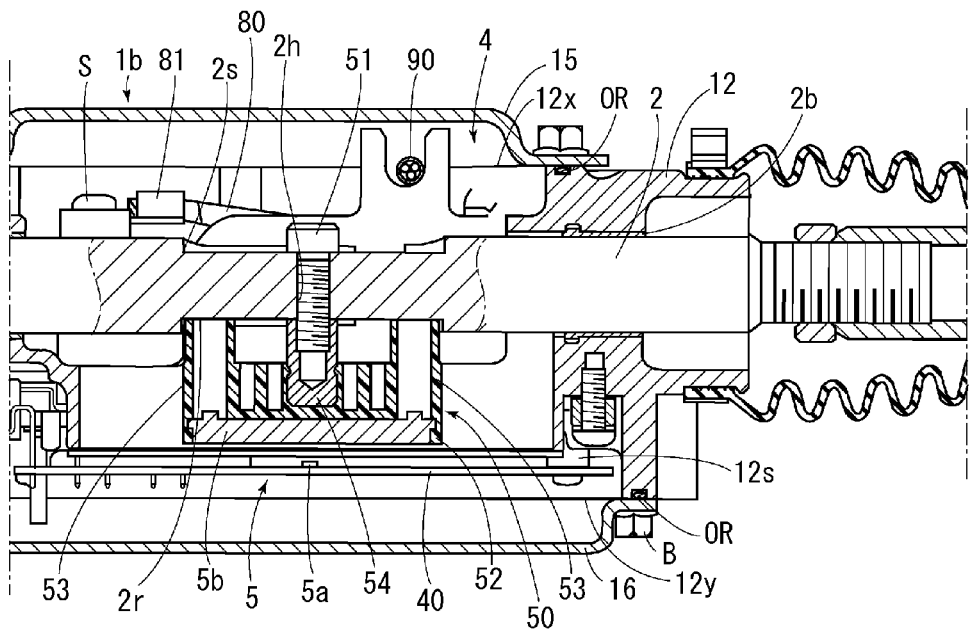
FIG. 3 is an enlarged lateral cross-sectional view showing a controller of the rear wheel steering apparatus according to the embodiment disclosed here.
Figure 4:
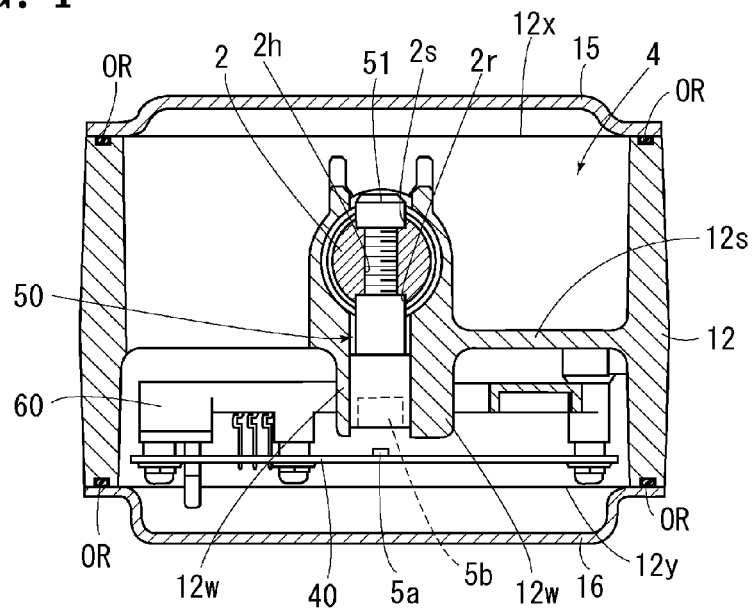
FIG. 4 is an enlarged longitudinal cross-sectional view showing the controller of the rear wheel steering apparatus according to the embodiment disclosed here.

On the other hand, as illustrated in FIG. 3, the electronic circuit board 40 structuring an electronic control unit and a magnetic block 50 structuring a displacement detection device 5 are housed within the second housing 1b. The displacement detection device 5 includes a displacement sensor 5a including a magnetic vector sensor, for example, and a permanent magnet 5b including a neodymium magnet, for example. The displacement sensor 5a is supported by the electronic circuit board 40. The permanent magnet 5b is retained within the magnetic block 50. The magnetic block 50 is configured to detect an axial displacement of the rod 2 when the rod 2 moves linearly (linear motion) and to block the rotation of the rod 2. Plural elements for controlling the actuation of the electric motor 3a is mounted to the electronic circuit board 40. As illustrated in FIG. 4, the electronic circuit board 40 is supported by a support board 60 at portions that are spaced from one another by a predetermined distance. The support board 60 is fixed to the casing 12 by means of screws.

As illustrated in FIGS. 3 and 4, first and second long grooves (substantially rectangular recessed portions) 2r, 2s that are elongated in an axial direction are formed at an outer periphery surface of the rod 2. The magnetic block 50 is positioned at the first long groove 2r and a bolt 51 is inserted via the second groove 2s to be fixed to the rod 2. The magnetic block 50 is made of synthetic resin. As illustrated in FIG. 3, the magnetic block 50 includes a retaining portion 52 that houses the permanent magnet 5b and a pair of leg portions 53, 53 extending from ends of the retaining portion 52, respectively. A nut 54 made of metal is formed by insert molding between the leg portions 53, 53. As illustrated in FIG. 4, a support portion 12s is formed inside the casing 12. A pair of wall portions 12w, 12w which are in parallel with an axis of the rod 2 is formed. The retaining portion 52 is assembled to be retained between the wall portions 12w, 12w and the bolt 51 is inserted into a through hole 2h of the rod 2 to be threadingly engaged with the nut 54. In consequence, the rod 2 is supported so as not to rotate relative to the wall portions 12w, 12w of the casing 12, that is, so as not to rotate relative to the housing 1 by means of the magnetic block 50. FIG. 4 shows space at a cover member 16 to which the electronic circuit board 40 is attached and space at a cover member 15 is not shown.

According to the actuator 3 of the embodiment, upon the rotational actuation of the hollow rotation shaft 20 by the electric motor 3a, the speed of the rotational output is reduced by the speed reduction mechanism 3b of the planetary gear mechanism 30 to rotate the nut member 36 and thus the rotation of the nut member 36 is converted to the linear motion of the rod 2 by the linear motion mechanism 3c. Thus, as described above, the relative position between the support portion RS of the rear axle RA and the link LS is changed so that the distance between the support portion RS and the link LS is expanded and contracted, and thus a steering angle of the rear wheels is adjusted.

Figure 5:
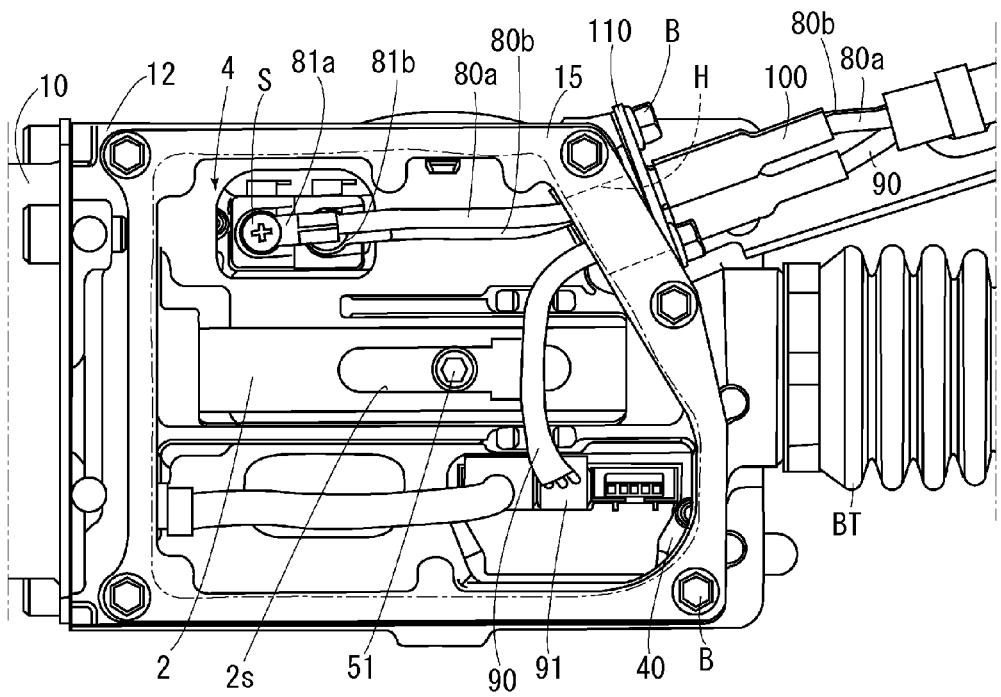
FIG. 5 is a partially cut-away plan view of the controller of the rear wheel steering apparatus where a cover portion is cut-away according to the embodiment disclosed here.

For an explanatory purpose to show the construction in the space at the cover member 15 within the casing 12 that forms the second housing 1b, a center portion of the cover member 15 is cut-away in FIG. 5. Power lines 80a, 80b, and signal lines 90 (e.g., three) are electrically connected to the electronic circuit board 40 that structures the controller 4. Particularly, the power lines 80a, 80b include connection terminals 81a, 81b provided at ends of the power lines 80a, 80b, respectively. The connection terminals 81a, 81b are directly connected to the electronic circuit board 40 by means of a screw S. The signal lines 90 are connected to the electronic circuit board 40 via a connecter 91. In those circumstances, because the electronic circuit board 40 is supported by the support board 60 at portions spaced from one another by the predetermined distance and the support board 60 is threadingly fixed to the casing 12, the power lines 80a, 80b and the signal lines 90 can be connected to the electronic circuit board 40 readily and securely. A downsized relatively inexpensive connecter is applied as the connecter 91 because there is no need for the connecter to have a water-proof structure. The casing 12 includes a through hole H that is indicated with a dotted line in FIG. 5. The power lines 80a, 80b and the signal lines 90 are lead to the outside via the through hole H. The number of the power lines and the signal lines are not limited to the above-explained example and can be varied, thus single number power line and the signal line or plural number of the power lines and the signal lines can be applied.

Figure 7:
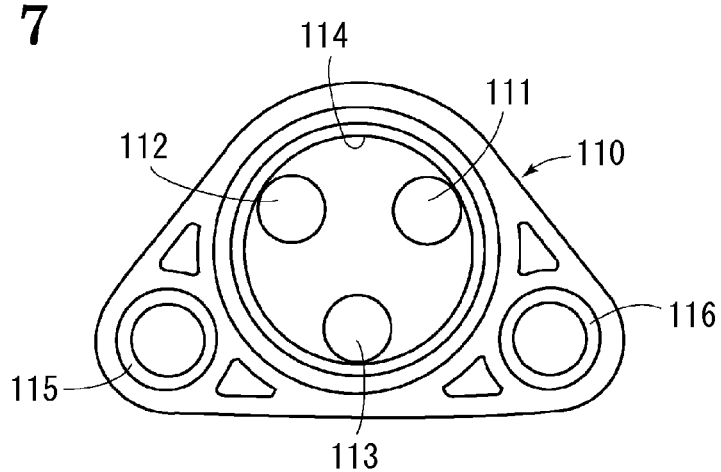
FIG. 7 is a plan view of the support bracket of the rear wheel steering apparatus according to the embodiment disclosed here.
Figure 8:
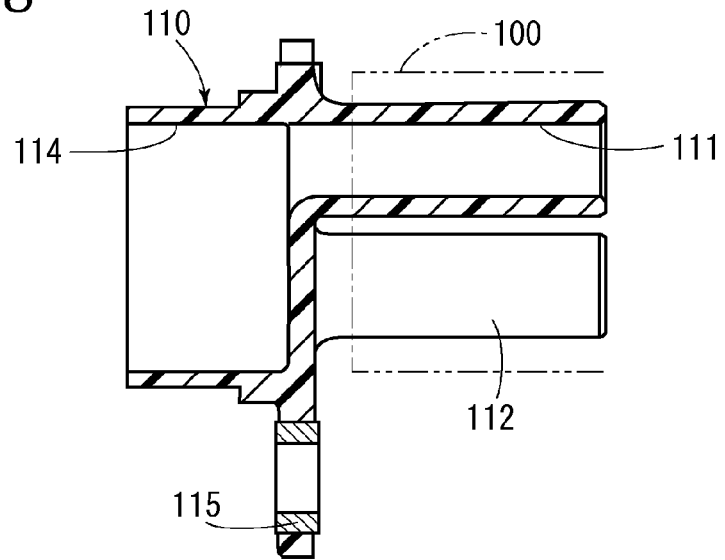
FIG. 8 is a cross-sectional view of the support bracket of the rear wheel steering apparatus according to the embodiment disclosed here.

The power lines 80a, 80b and the signal lines 90 of the embodiment are inserted through communication tubes 111, 112, 113 (see FIGS. 7 and 8) of the support bracket 110 and a thermal shrinkage tube 100 to be positioned therein. Heat melt adhesive agent is provided inside the thermal shrinkage tube 100 and fills space among the power lines 80a, 80b and the signal lines 90. The support bracket 110 is made of synthetic resin. As illustrated in FIGS. 7 and 8, the communication tubes 111, 112, 113 are integrally formed with the support bracket 110 and bushes 115, 116 for the attachment are integrally formed with the support bracket 110. The power lines 80a, 80b are inserted through the communication tubes 111, 112 to be positioned therein and three signal lines 90 are inserted through the communication tube 113 to be positioned therein.

Figure 6:
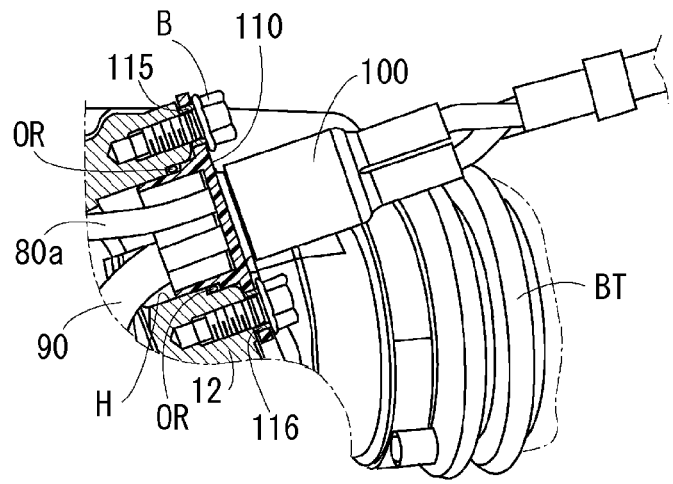
FIG. 6 is a partially cross-sectional view showing an attaching portion of a thermal shrinkage tube and a support bracket of the rear wheel steering apparatus according to the embodiment disclosed here.

After the heat melt adhesive agent is applied around each of the power lines 80a, 80b and the signal lines 90, or after the heat melt adhesive agent is provided inside the thermal shrinkage tube 100, the thermal shrinkage tube 100 is provided to cover, or surround a portion of the power lines 80a, 80b and the signal lines 90 that are lead from each of the communication tubes 111, 112, 113. Then, the thermal shrinkage tube 100 and the adhesive agent are heated. By heating the thermal shrinkage tube 100 together with the adhesive agent, the thermal shrinkage tube 100 contracts, or shrinks to come in contact with the power lines 80a, 80b and the signal lines 90 tightly, and the space between each of the power lines 80a, 80b and the signal lines 90 is filled with the melted adhesive agent so as to seal the thermal shrinkage tube 100. After the heating process of the thermal shrinkage tube 100, as illustrated in FIG. 6, the support bracket 110 is attached to the casing 12 via an O-ring OR of a seal member, a bolt B is inserted through each of the bushes 115, 116 to be fixed to the casing 12. The power lines 80a, 80b and the signal lines 90 are liquid-tightly supported at the through hole H of the casing 12. Further, the cover members 15, 16 are joined to the casing 12 at the opening portions 12x, 12y via the O-rings OR. Because the space in the casing 12 is filled to be sealed, it is not necessary to provide a water-proof connecter to a connection portion (see FIG. 5) of the power lines 80a, 80b and the signal lines 90 to the electronic circuit board 40.

A manufacturing method of the actuator unit AU will be explained hereinafter. First, the stator 24 on which the coils 23 is wound is press-fitted into the cylinder portion 10 by means of a press-fitting apparatus to be fixed at a predetermined position shown in FIG. 2. The motor cover 25 is inserted to be positioned in the cylinder portion 10, and the snap ring 14 is fixed to the annular groove 10a provided on an inner periphery of the cylinder portion 10. Separately from the foregoing steps, after the bearing 25b is press-fitted onto the hollow rotation shaft 20 to which the sun gear 31 is integrally formed, a presser member 22a made of resin and for retaining the permanent magnet 22 is press-fitted onto the hollow rotation shaft 20, and the core 21 is press-fitted onto the hollow rotation shaft 20. The permanent magnet 22 is magnetized in a sub-assembly state where the permanent magnet 22 is accommodated in the core 21 and the presser member 22b is press-fitted onto the hollow rotation shaft 20.

Next, the hollow rotation shaft 20 is inserted into the hollow portion of the stator 24 and the bearing 25b is retained in a state where the bearing 25b is fitted to the inner periphery of the motor cover 25 at the hollow portion of the motor cover 25. Further, a support member 26 to which a plastic magnet 6b for a magnetic pole sensor 6 is press-fitted onto an end portion of the hollow rotation shaft 20. After the plastic magnet 6b is magnetized, the casing 12 is joined to the cylinder portion 10 at the opening thereof closer to the electric motor 3a (i.e., right-hand side in FIG. 2) by means of bolts. An outer race of the bearing 12b is press-fitted into the annular groove 12a of the casing 12, and an inner race of the bearing 12b is fitted onto the hollow rotation shaft 20 when joining the casing 12 to the cylinder portion 10.

The inner race 37a of the bearing 37 is fitted onto the nut member 36, inner race 37a is retained by the spacer 37c, and the outer race 37b of the bearing 37 is fitted into the holder 34. Then, the ring gear 33 is attached to the holder 34, the planetary gear 32 is supported on the nut member 36 by means of the pin 35, and an engaging member 38 is engaged with the pin 35. Thereafter, the male screw portion 2c of the rod 2 is threadingly engaged with the female screw portion 36c of the nut member 36, and the nut 2d is threadingly secured to the end of the male screw portion 2c to form a sub-assembly of the rod 2.

The sub-assembly of the rod 2 is inserted into the hollow rotation shaft 20 shown in FIGS. 1 to 3, the sun gear 31 is assembled to be engaged with the planetary gear 32 and the ring gear 33, and the holder 34 is inserted until an axial end surface of the holder 34 comes in contact with a side end surface of the snap ring 14. Thereafter, the connection cover 11 is attached to the cylinder portion 10 and the lock nut 13 is threadingly engaged with the cylinder portion 10. Accordingly, the outer race 37b of the bearing 37 and the holder 34 are firmly sandwiched and supported between the snap ring 14 and the connection cover 11. In those circumstances, the rod 2 extends penetrating through the bushes 2a, 2b provided at the casing 12 to reach the outside of the casing 12.

The magnetic block 50 is positioned at the first long groove 2r of the rod 2 within the casing 12 so that the retaining portion 52 is retained between the wall portions 12w, 12w. Thus, when the bolt 51 is inserted into the through hole 2h of the rod 2 and threadingly engaged with the nut 54, the rod 2 is supported so as not to be rotatable relative to the housing 1.

Further, the electronic circuit board 40 to which the displacement sensor 5a is mounted and the support board 60 that supports the electronic circuit board 40 are housed in the casing 12 and are fixed at the position where the displacement sensor 5a faces the permanent magnet 5b. Further, the power lines 80a, 80b and the signal lines 90 are inserted into the support bracket 110 and the thermal shrinkage tube 100 and after the heating process is completed, the support bracket 110 is joined to the casing 12 via the O-ring OR, and the power lines 80a, 80b and the signal lines 90 are connected to the electronic circuit board 40. Then, upon joining the cover members 15, 16 to the casing 12 via the O-rings OR serving as the sealing member, the casing 12 is sealed tightly. Thus, the liquid-tight state is maintained by the thermal shrinkage tube 100 and the O-rings OR to securely perform the water-proof capacity of the casing 12. After the assembling process explained above, the ball joint JL is connected to the end of the rod 2 and a rubber boot BT is attached to the casing 12.

The disclosure provides a rear wheel steering apparatus for a vehicle configured to be provided at a suspension mechanism supporting a rear wheel of the vehicle and for steering the rear wheel. According to the construction of the embodiment, the rear wheel steering apparatus includes the housing (1) configured to be connected to the suspension mechanism via the first connection member (ball joint JA) and the second connection member (ball joint JL), the housing (1) including the cylinder portion (10) and the casing (12), the electric motor (3a) housed in the cylinder portion (10), the speed reduction mechanism (3b) housed in the cylinder portion (10) and reducing speed of an output of the electric motor (3a), the linear motion mechanism (3c) including the nut member (36) rotatably connecting to the speed reduction mechanism (3b) and the rod (2) threadingly engaged with the nut member (36) and connecting to the second connection member (ball joint JL), the linear motion mechanism (3c) converting a rotation of the nut member (36) to a linear motion of the rod (2), the casing (12) including at least one opening portion (12x, 12y) that opens in parallel to the rod (2) and the communication hole (H) provided separately from the opening portion (12x, 12y), the casing (12) positioned surrounding the rod (2) extending from the cylinder portion (10) and being fixed to the cylinder portion (10), the cover member (15, 16) joined to the casing (12) to seal an opening portion of the casing (12), the controller (4) housed in the casing (12) and controlling an actuation of the electric motor (3a), the power line (80a, 80b) and the signal line (90) electrically connected to the controller (4) in the casing (12), and the thermal shrinkage tube (100) surrounding the power line (80a, 80b) and the signal line (90) to retain thereof. The power line (80a, 80b) and the signal line (90) are liquid-tightly supported in the communication hole (H) of the casing (12) via the thermal shrinkage tube (100).

According to the construction of the embodiment, the controller (4) can be accommodated in the housing (1) appropriately and readily, and a secure water-proof structure without a known water-proof connecter can be attained.

According to the embodiment, the adhesive agent is filled in the thermal shrinkage tube (100) between the power line (80a, 80b) and the signal line (90).

According to the construction of the embodiment, further secure water-proof structure can be attained.

According to the embodiment, the rear wheel steering apparatus for the vehicle includes the support bracket (110) housing the power line (80a, 80b) and the signal line (90) and liquid-tightly joined to the casing (12) at the communication hole (H). The thermal shrinkage tube (100) is attached to surround a portion where the power line (80a, 80b) and the signal line (90) are lead from the support bracket (110) to the outside.

According to the construction of the disclosure, the power line (80a, 80b) and the signal line (90) can be readily and securely supported in the communication hole (H) of the casing (12) and the power line (80a, 80b) and the signal line (90) can be further readily assembled to the casing (12).

According to the embodiment, the controller (4) includes the electronic circuit board (40) on which a plurality of elements for controlling the actuation of the electric motor (3a) are mounted and the support board (60) supporting the electronic circuit board (40) at portions that are spaced apart one another by a predetermined distance. The power line (80a, 80b) and the signal line (90) are joined to the electronic circuit board (40) in the casing (12).

According to the construction of the embodiment, the power line (80a, 80b) and the signal line (90) can be readily and securely connected to the electronic circuit board (40) that is appropriately supported at the support board (60).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rear wheel steering apparatus for a vehicle configured to be provided at a suspension mechanism supporting a rear wheel of the vehicle and for steering the rear wheel, the rear wheel steering apparatus comprising:
    a housing configured to be connected to the suspension mechanism via a first connection member and a second connection member, the housing including a cylinder portion and a casing;
    an electric motor housed in the cylinder portion;
    a speed reduction mechanism housed in the cylinder portion and reducing speed of an output of the electric motor;
    a linear motion mechanism including a nut member rotatably connecting to the speed reduction mechanism and a rod threadingly engaged with the nut member and connecting to the second connection member, the linear motion mechanism converting a rotation of the nut member to a linear motion of the rod;
    the casing including at least one opening portion that opens in parallel to the rod and a communication hole provided separately from the opening portion, the casing positioned surrounding the rod extending from the cylinder portion and being fixed to the cylinder portion;
    a cover member joined to the casing to seal the opening portion of the casing;
    a controller housed in the casing and controlling an actuation of the electric motor;
    a power line and a signal line electrically connected to the controller in the casing; and
    a thermal shrinkage tube surrounding the power line and the signal line to retain thereof; wherein
    the power line and the signal line are liquid-tightly supported in the communication hole of the casing via the thermal shrinkage tube.

2. The rear wheel steering apparatus for the vehicle according to claim 1, wherein an adhesive agent is filled in the thermal shrinkage tube between the power line and the signal line.

3. The rear wheel steering apparatus for the vehicle according to claim 1 further comprising:
    a support bracket housing the power line and the signal line and liquid-tightly joined to the casing at the communication hole; wherein
    the thermal shrinkage tube is attached to surround a portion where the power line and the signal line are lead from the support bracket to the outside.

4. The rear wheel steering apparatus for the vehicle according to claim 2 further comprising:
    a support bracket housing the power line and the signal line and liquid-tightly joined to the casing at the communication hole; wherein
    the thermal shrinkage tube is attached to surround a portion where the power line and the signal line are lead from the support bracket to the outside.

5. The rear wheel steering apparatus according to claim 1, wherein the controller includes an electronic circuit board on which a plurality of elements for controlling the actuation of the electric motor are mounted and a support board supporting the electronic circuit board at portions that are spaced apart one another by a predetermined distance; wherein the power line and the signal line are joined to the electronic circuit board in the casing.

6. The rear wheel steering apparatus according to claim 2, wherein the controller includes an electronic circuit board on which a plurality of elements for controlling the actuation of the electric motor are mounted and a support board supporting the electronic circuit board at portions that are spaced apart one another by a predetermined distance; wherein the power line and the signal line are joined to the electronic circuit board in the casing.

7. The rear wheel steering apparatus according to claim 3, wherein the controller includes an electronic circuit board on which a plurality of elements for controlling the actuation of the electric motor are mounted and a support board supporting the electronic circuit board at portions that are spaced apart one another by a predetermined distance; wherein the power line and the signal line are joined to the electronic circuit board in the casing.

8. The rear wheel steering apparatus according to claim 4, wherein the controller includes an electronic circuit board on which a plurality of elements for controlling the actuation of the electric motor are mounted and a support board supporting the electronic circuit board at portions that are spaced apart one another by a predetermined distance; wherein the power line and the signal line are joined to the electronic circuit board in the casing.

\* \* \* \* \*